Oct. 23, 1962

G. C. MOEN 3,059,848

HELICOPTER WEIGHT AND LOAD COMPUTER

Filed March 25, 1959

INVENTOR.
Gene C. Moen
BY

ATTORNEYS

Oct. 23, 1962 G. C. MOEN 3,059,848
HELICOPTER WEIGHT AND LOAD COMPUTER
Filed March 25, 1959 4 Sheets-Sheet 2

INVENTOR.
Gene C. Moen
BY
ATTORNEYS

BASED ON:
1. OUT OF GROUND EFFECT
2. 100% RELATIVE HUMIDITY
3. 0-KNOTS SURFACE WIND

BASED ON:
1. IN GROUND EFFECT
2. 100 RELATIVE HUMIDITY
3. 0-KNOTS SURFACE WIND

INVENTOR.
Gene C. Moen
BY
ATTORNEYS

Oct. 23, 1962
G. C. MOEN
3,059,848
HELICOPTER WEIGHT AND LOAD COMPUTER
Filed March 25, 1959
4 Sheets-Sheet 4
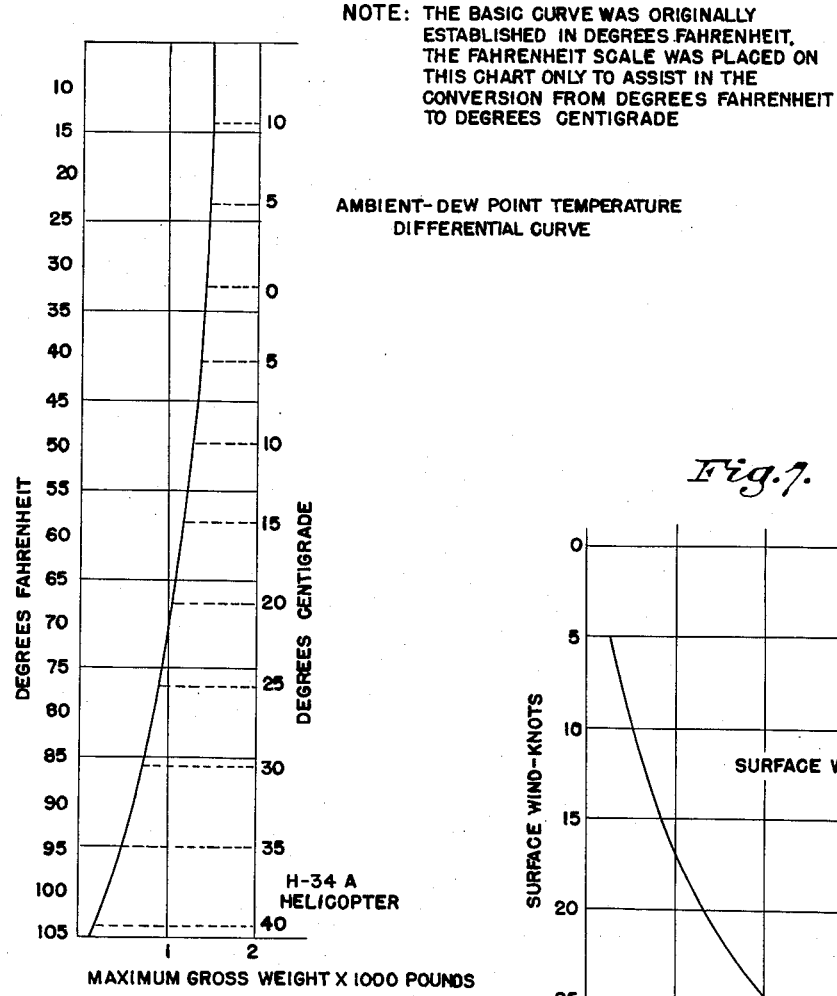
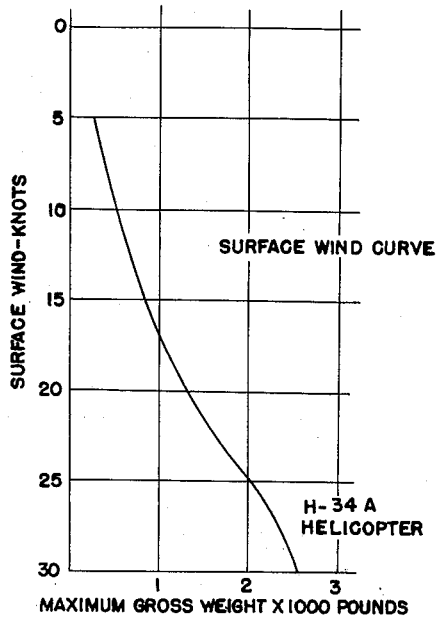
INVENTOR.
Gene C. Moen

United States Patent Office 3,059,848
Patented Oct. 23, 1962

3,059,848
HELICOPTER WEIGHT AND LOAD COMPUTER
Gene C. Moen, Denbigh, Va.
(124 Lakeview Circle, Kingsport, Tenn.)
Filed Mar. 25, 1959, Ser. No. 801,975
6 Claims. (Cl. 235—78)
(Granted under Title 35, U.S. Code (1952), sec. 266)

The invention described herein may be manufactured and used by or for the Government for governmental purposes without the payment of any royalty thereon.

The present invention relates to computing devices and more particularly to a device for computing the maximum gross weight and net load capabilities of a helicopter.

At the present time, the helicopter pilot is handicapped in determining the maximum gross weight and net load capabilities of his craft by having to make use of several charts, extracting information therefrom, and then making computations by hand. Because of the charts which he must use and the computations he must make, the resulting figures sometimes have built-in error and, in addition, are subject to human error.

The present invention concerns a computer embodying several scales disposed so that by using the numerical quantities of the variables involved, the operator may readily determine maximum gross weight, net load capabilities, or maximum basic operating weight, depending upon what variable factors are known. The particular form of the invention illustrated and described in detail herein is a circular computer for a U.S. Army H–34A helicopter; however, the principles of the invention are the same whether the computer takes the form of a circular computer or a straight slide rule or whether the computer is for a helicopter of a different model.

One of the objects of the invention is to provide a device for computing the maximum gross weight and net load capabilities or the maximum basic operating weight under given conditions.

Another object of the invention is to provide a device for making these computations mechanically in an accurate and expeditious manner.

Another object of the invention is to provide a computer simple in design and convenient to use.

Further objects and a more complete understanding of the invention may be obtained by referring to the following description and claims taken in conjunction with the accompanying drawings which show an illustrative embodiment of the construction forming the basis of the invention and in which:

FIG. 6 is a chart which shows the effect of humidity on gross weight; and

FIG. 7 is a chart which shows the effect of the surface wind on gross weight.

Before describing in detail the structure of the computer and the relationship of the scales on the computer, a general explanation of the pertinent factors and of the meaning of terms used herein will be given to facilitate an understanding of the invention.

The maximum net load that a helicopter can successfully pick up is a function of its operational weight, fuel load, and maximum gross weight, all three of which are variables. While the operational weight and the fuel load are variables, their numerical values are readily available to a helicopter pilot. The maximum gross weight for a helicopter, being a variable, is in itself controlled by four additional variables as follows: ambient air density, surface wind, ground effect, and available power. Inasmuch as ambient air density is a function of pressure altitude, ambient temperature and humidity, it can also be said that the maximum gross weight for a helicopter is also a function of these three variables. Thus, the maximum gross weight of a helicopter is a function of the following six separate and distinct variables: pressure, altitude, ambient temperature, humidity, surface wind, ground effect, and available power. By placing scales representative of the effects of these variables in relation to the gross weight and by presenting them in a manner so that their effect is additive on the gross weight scale, helicopter operational problems can be readily computed.

For the purpose of this description and to facilitate an understanding thereof, the following terms shall have the meaning stated. Maximum net load is the weight of the cargo and passengers which can be lifted by the helicopter either internally and/or by external sling load. Maximum gross weight is the maximum allowable total weight of the helicopter when fully loaded. Fuel load is the weight of the fuel on board the helicopter for a specific mission. Operational weight is the weight of the helicopter minus the fuel and net load for a specific mission. Pressure altitude is the altitude corresponding to a given pressure in a standard atmosphere. Ambient temperature is the temperature of the surrounding air mass. Humidity is the state of the atmosphere in reference to water vapor. Dew point temperature is the temperature at which under ordinary conditions condensation begins in a cooling mass of air. Surface wind is the velocity of the air mass with reference to the ground. Ground effect is the apparent increase in lift while the helicopter is hovering close to the ground with an altitude between 0 and 1½ times the helicopter rotor diameter. Critical altitude is the maximum altitude at which a supercharger can maintain a pressure in the intake manifold of an engine equal to that existing during normal operation at rated power at sea level.

Figure 4:
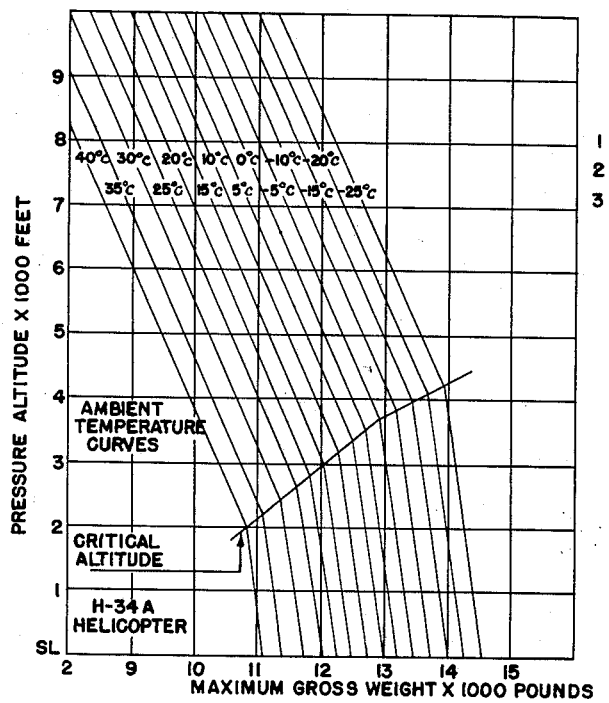
FIG. 4 is a chart which reflects the maximum gross weight that the helicopter can lift for a specific pressure altitude, ambient temperature condition based on 100% relative humidity, zero knots surface wind and out-of-ground effect.
Figure 5:
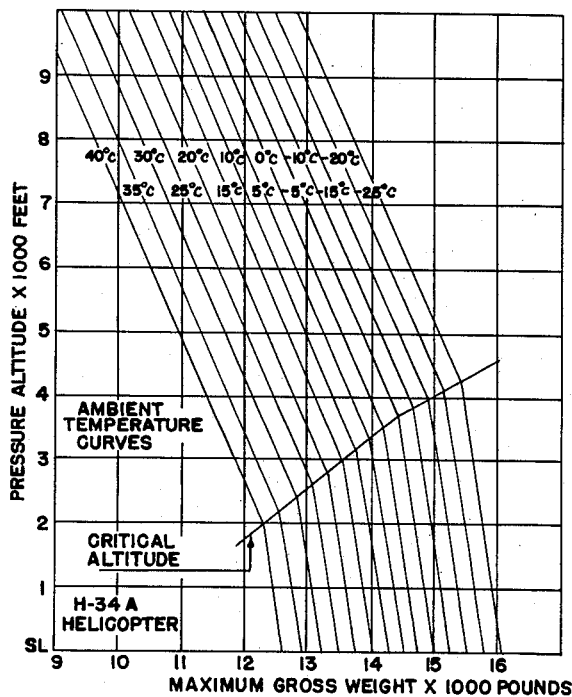
FIG. 5 is a chart which reflects the maximum gross weight that the helicopter can lift for a specific pressure altitude, ambient temperature condition based on 100% relative humidity, zero knots surface wind and in-ground effect.

The charts in FIGS. 4 to 7 have been plotted from actual flight test data of the H–34A helicopter. Inasmuch as the maximum gross weight is a function of the several variables embodied in the charts in FIGS. 4 to 7, the effect of each variable on the maximum gross weight can be determined from the appropriate chart. An analysis of each of these charts establishes certain facts. In FIGS. 4 and 5, the slope of the ambient temperature curve changes as it intersects the critical altitude curve; therefore, separate ambient temperature and pressure altitude scales are required for calculations above the critical altitude and for calculations below the critical altitude. For a specific ambient temperature, there is a corresponding critical altitude; for example, 40 degrees—2,000 feet; 15 degrees—3,000 feet. Each 1,000 foot change in pressure altitude above the critical altitude results in a 450 pound change in maximum gross weight, and each 1,000 foot change in pressure altitude below the critical altitude results in a 130 pound change in maximum gross weight. Each 5 degree centigrade change in ambient temperature both above the critical altitude and below the critical altitude results in a non-linear change in the maximum gross weight. In comparing FIG. 4 with FIG. 5, it is noted that the slope of the ambient temperature curves and also the critical altitude curves are approximately equal and that for any specific ambient temperature and pressure altitude there is a difference of 1,500 pounds in the maximum gross weight because of the change in condition of ground effect. From FIG. 6 it can be determined that a non-linear scale can be used for computing the effect of humidity on maximum allowable gross weight; and from FIG. 7 it can be determined that a non-linear scale can be used for computing the effect of surface wind on the maximum gross weight.

Figure 1:
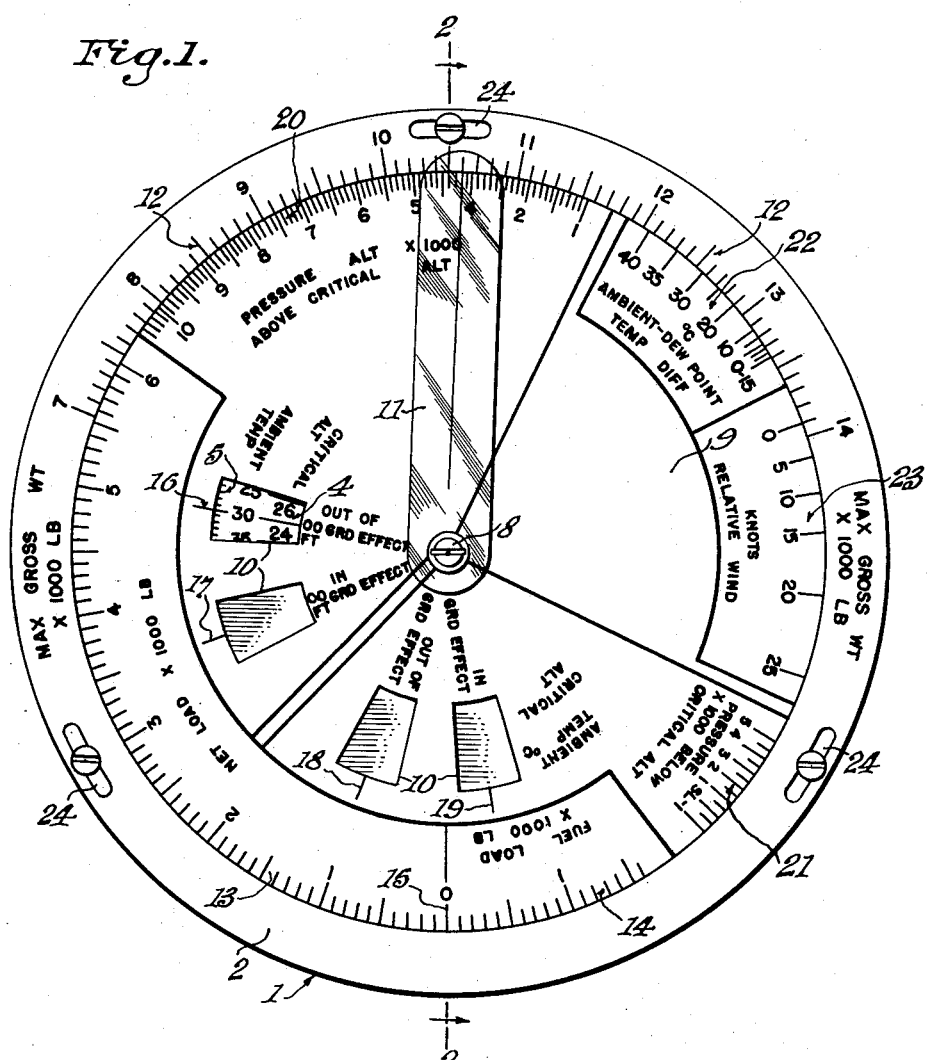
FIG. 1 is a plan view of the device.
Figure 2:
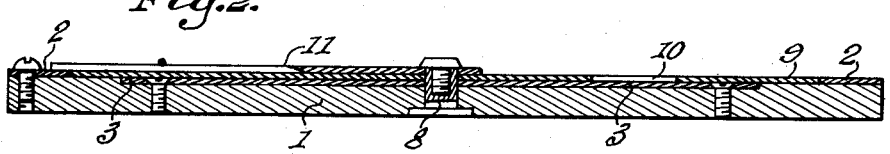
FIG. 2 is a vertical section through the device on line 2—2 of FIG. 1.
Figure 3:
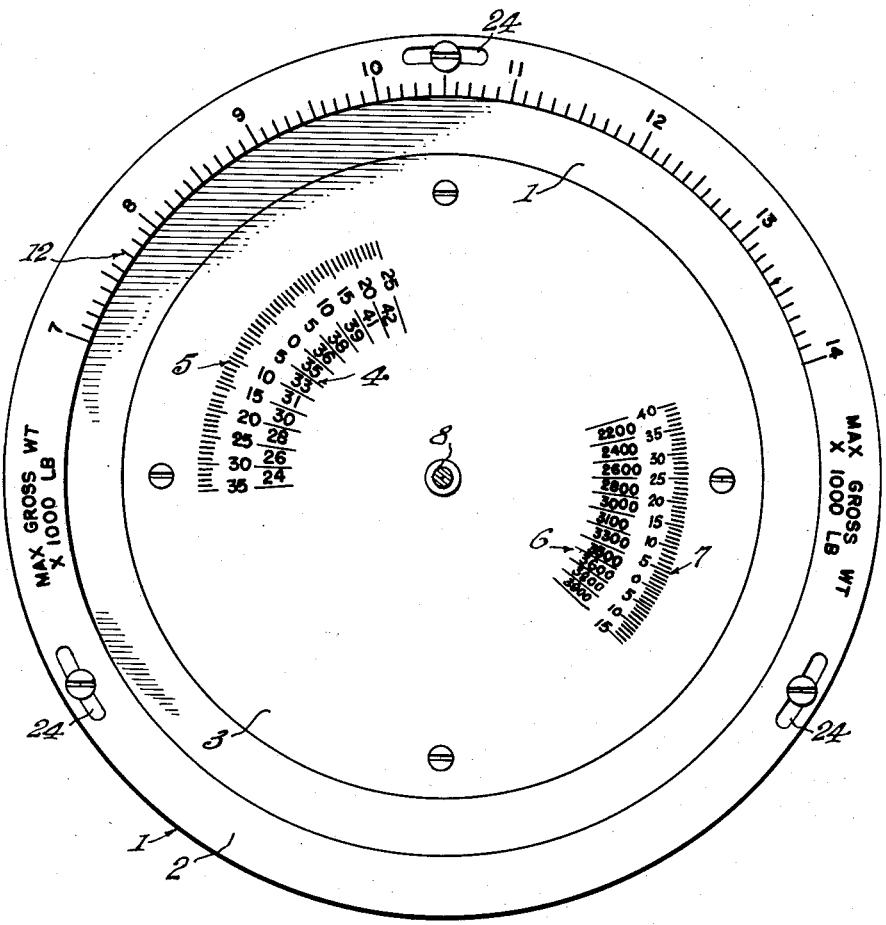
FIG. 3 is a plan view of the device with the rotating disk and the cross-hair arm removed.

A preferred embodiment of the invention is shown in FIGS. 1, 2, and 3. Affixed to base 1 is outer ring 2 having located thereon maximum gross weight scale 12 and stationary disk 3 having located thereon critical altitude scale 4 and ambient temperature scale 5 above critical altitude and critical altitude scale 6 and ambient temperature scale 7 below critical altitude. Rotatably mounted on axis 8 and above stationary disk 3 is rotating disk 9 having windows 10 located so that scales 4, 5, 6, and 7 on stationary disk 3 may be viewed. Stationary disk 3 and rotating disk 9 are located within the area encircled by outer ring 2, and stationary disk 3 is recessed in base 1 such that rotating disk 9 lies in the same plane as outer ring 2. Rotating disk 9 has located thereon four index marks, two pressure altitude scales, ambient dew point temperature differential scale, relative wind scale, net load scale and fuel load scale. Cross-hair arm 11 is rotatably mounted on axis 8 above rotating disk 9 and extends from axis 8 across rotating disk 9 into maximum gross weight scale 12 on outer ring 2. The meaning of the various scales, an explanation of their location on the computer and their relative relationship will be explained in the following paragraphs.

Maximum gross weight scale 12 is the basic scale of the computer. It denotes the maximum allowable gross weight as a function of the many variables, and the other scales of the computer are derived from it. Scale 12 is a linear scale calibrated in increments of 100 pounds from 7,000 pounds to 14,000 pounds, the normal gross weight range of the H-34A helicopter. Based on experiments, an increment of two circular degrees for each 100 pounds was established in placing scale 12 on outer ring 2. On larger type helicopters, the increment would be one circular degree for each 100 pounds, and on smaller helicopters, the increment for each 100 pounds would be larger than two circular degrees.

Net load scale 13 and fuel load scale 14 are linear scales of the same increment as maximum gross weight scale 12 but are located on rotating disk 9. Scale 13 and scale 14 have a common zero point 15 with scale 13 extending therefrom in a clockwise direction and scale 14 in a counterclockwise direction.

Although the location of ground effect index marks 16, 17, 18, and 19 will be explained later, it should be noted at this time that for the above critical altitude condition pressure altitude scale 20, out-of-ground effect index 16 and in-ground effect index 17 and their related windows 10 are grouped within one segment of rotating disk 9. In order that this may be accomplished, critical altitude scale 4 and ambient temperature scale 5 are located on stationary disk 3 as shown in FIG. 3. For the below critical altitude condition a similar situation exists with critical altitude scale 6 and ambient temperature scale 7 being located on stationary disk 3 as shown in FIG. 3.

Above critical altitude ambient temperature scale 5 denotes the effects of the above critical altitude ambient temperature variable on the maximum gross weight. It is a non-linear scale marked in increments of 1 degree centigrade and spans the normal ambient temperature range in which the helicopter will operate. The increments of scale 5 are computed as follows: In the chart of FIG. 4, a constant value for the pressure altitude above critical altitude is selected; and for each successive ambient temperature value a maximum gross weight reading is obtained and the difference between them computed. Basing the increment on 100 pounds being equal to 2 circular degrees from maximum gross weight scale 12, the effect of the ambient temperature is converted into circular degrees so that the increments are determined as shown by scale 5. Scale 5 is 74 circular degrees in length and is calibrated from 35 degrees centigrade to −25 degrees centigrade. The critical altitude for each of the successive ambient temperatures is taken from the chart of FIG. 4 and embodied in scale 4.

Below critical altitude ambient temperature scale 7 is the same type of scale as scale 5 except that it denotes the effects of the ambient temperature variable below critical altitude and is 58½ circular degrees in length, calibrated from 40 degrees centigrade to −15 degrees centigrade. The increments are computed in the same manner as in scale 5. Scale 6 is determined in the same manner as scale 4; however, to assist in distinguishing between the two scales when viewing them through windows 10, scale 6, used for below critical altitude conditions, has the last two digits of the figures located on the scale on stationary disk 3 whereas scale 4, used for above critical altitude conditions, does not.

Above critical altitude pressure altitude scale 20 denotes the effect of the pressure altitude variable above critical altitude on maximum gross weight. It is a linear scale marked in increments of 100 feet and spans the normal pressure altitude range above critical altitude in which the helicopter will operate. The increment of the scale is computed as follows: In the chart of FIG. 4, a constant value for the ambient temperature is selected. For successive values of pressure altitude, a maximum gross weight reading is obtained and the difference between them computed. This difference between maximum gross weights is converted into circular degrees based on 100 pounds equal to 2 circular degrees from maximum gross weight scale 12. Thus, the increment is determined and scale 20 is placed on rotating disk 9. Scale 20 is 72 circular degrees in length and is calibrated from 2,000 feet to 10,000 feet.

Below critical altitude pressure altitude scale 21 is of the same type as scale 20, and the increment is determined in the same manner. The differences between the two scales are that scale 21 denotes the effect of the pressure altitude below critical altitude, and the length of scale 21 is 18 circular degrees calibrated from −1,000 feet to 5,000 feet.

Four index marks 16, 17, 18, and 19 on rotating disk 9 denote the effects of the ground effect variable on maximum gross weight. These index marks index the pressure altitude scale in relation to maximum gross weight scale 12 as a function of ambient temperature. Two of the index marks (16 and 17) are used for conditions above critical altitude, and the other two marks (18 and 19) are used for conditions below critical altitude. The exact manner in which these index marks are located on rotating disk 9 is as follows. From the chart of FIG. 4, it is determined that at pressure altitude of 6,000 feet. 5 degrees centigrade ambient temperature, out-of-ground effect, 100% relative humidity and zero knots surface wind, the maximum gross weight is 11,340 pounds. Therefore, the 6,000 foot reading on scale 20 is placed directly under the 11,340 reading on scale 12. Out-of-ground effect index mark 16 for the condition above critical altitude is then placed on rotating disk 9 at a point directly above the 5 degree reading on scale 5 visible through window 10. In-ground effect index mark 17 for the condition above critical altitude is located in the same manner except that the chart of FIG. 5 is used. Out-of-ground effect index mark 18 for the condition below critical altitude and in-ground effect index mark 19 for the condition below critical altitude are located on rotating disk 9 in the same manner as index marks 16 and 17 except that conditions below critical altitude govern and values selected in the charts in FIGS. 4 and 5 must be in that portion of the chart below critical altitude and scales 21 and 7 must be used instead of scales 20 and 5.

Ambient-dew point temperature differential scale 22 located on rotating disk 9 denotes the effect of humidity on the maximum gross weight. It is a non-linear scale marked in increments of 5 degrees centigrade and spans the normal ambient temperature range in which the helicopter will operate. Increments for the scale are determined from the chart of FIG. 6. For each of the successive temperature values, a maximum gross weight reading is taken at the ambient-dew point temperature differential curve and the difference between them computed. This establishes the increment in pounds which is then converted into circular degrees to place it as a scale on rotating disk 9, using 100 pounds equal to 2 circular degrees from maximum gross weight scale 12. Scale 22 is 27 circular degrees in length and is calibrated from 40 degrees centrigrade to —15 degrees centigrade.

Surface or relative wind scale 23 located on rotating disk 9 denotes the effect of surface wind on the maximum gross weight. It is a non-linear scale marked in increments of 5 knots and spans the normal relative wind range in which the helicopter will operate. Increments for the scale are determined from the chart of FIG. 7. For each of the successive values of wind velocity, a maximum gross weight reading is taken at the surface wind curve and the difference between them computed. This establishes the increment in pounds which is then converted into circular degrees to place it as a scale on rotating disk 9, using 100 pounds equal to 2 circular degrees from maximum gross weight scale 12. Scale 23 is 40 circular degrees in length and is calibrated from zero to 25 knots.

No two helicopters of the same model perform identically because of variations in engine time, carburetor mixture settings, and similar reasons. To compensate for these factors, a fine adjustment for the computer is desirable. Screw-slot arrangements 24 are provided to enable such an adjustment to be made.

The use of the computer and its principles of operation will be shown through consideration of a sample problem and determination of a solution thereto.

*Problem.*—Find the net load capabilities of the H–34A helicopter for the following conditions: pressure altitude, 200 feet; ambient temperature, 30 degrees centigrade; out-of-ground effect; dew point temperature, 18 degrees centigrade; surface wind, 5 knots; fuel load, 750 pounds; basic operating weight, 7,900 pounds.

*Solution.*—Since pressure altitude of 4,200 feet for the condition of 30 degrees centigrade is above critical altitude, the above critical altitude scales must be used in making computations. Succeeding steps in the solution are as follows:

First, align out-of-ground effect index mark 16 with the 30 degree reading on ambient temperature scale 5. See FIG. 1.

Second, align the cross hair of cross hair arm 11 over the 4,200 foot reading on pressure altitude scale 20 and then read under the cross hair the maximum gross weight on scale 12. As shown in FIG. 1, this reading is 10,600 pounds, but the other factors in the problem have not been applied.

Third, while holding cross hair arm 11 stationary, rotate disk 9 counterclockwise until the numerical value on ambient-dew point differential scale 22 which is the same as the ambient temperature given in the problem (30 degrees) is aligned under the cross hair of arm 11. While holding disk 9 stationary, move arm 11 until the cross hair is aligned over the numerical value on scale 22 which is the same as the dew point temperature given in the problem (18 degrees). Under the cross hair of arm 11, read the maximum gross weight on scale 12, which would be 10,980 pounds. In this step of the computations, the maximum gross weight has been corrected for the humidity condition, which correction has amounted to 380 pounds.

Fourth, while again holding cross hair arm 11 stationary, rotate disk 9 counterclockwise until the zero reading on relative wind scale 23 is aligned underneath the cross hair of arm 11. Then, while holding disk 9 stationary, move arm 11 until the cross hair is aligned over the numerical value (5 knots) of the surface wind on scale 23. Under the cross hair of arm 11, read the maximum gross weight on scale 12, which would be 11,220 pounds. In this step of the computations, the maximum gross weight has been further corrected for the surface wind condition, which correction amounted to 240 pounds. The maximum gross weight has now been corrected for all conditions given in the problem.

Fifth, to determine the net load, a final step, subtractive in nature, is accomplished as follows. While holding cross hair arm 11 stationary on the corrected maximum gross weight determined in the previous step (11,220 pounds), rotate disk 9 clockwise until the numerical valve of the fuel load (750 pounds) on scale 14 is aligned with the numerical value of the basic operating weight (7,900 pounds) on scale 12. The net load figure is then read under the cross hair of arm 11 on net load scale 13, which answer is 2,570 pounds.

I claim:

1. A mechanical computing device for computing weight and load capabilities of a helicopter comprising a base, a first disk fixedly secured to said base, a second disk rotatably mounted on said base above said first disk and including radially disposed apertures therein for viewing areas of said first disk, a flat ring secured to said base and encompassing said first and second disks, said flat ring having circumferentially spaced slots and fastening means passing through said slots adjustably securing said ring to said base and an indicator rotatably mounted on said base coaxially with said first and second disks and overlying said second disk and extending beyond said second disk to said flat ring, each said first disk, second disk and flat ring having located thereon at least one scale selectively representing meteorological and aircraft loading factors, whereby upon selective rotation of said second disk and said indicator relative to said first disk and said flat ring the weight and load capabilities of a helicopter for given operating conditions may be determined.

2. A mechanical computing device for computing weight and load capabilities of a helicopter comprising a base, a first disk fixedly secured to said base, a second disk rotatably mounted on said base above said first disk and including radially disposed apertures therein for viewing areas of said first disk, a flat ring secured to said base and encompassing said first and second disks, said flat ring having circumferentially spaced slots and fastening means passing through said slots adjustably securing said ring to said base and an indicator rotatably mounted on said base coaxially with said first and second disks and overlying said second disk and extending beyond said second disk to said flat ring, a scale representing maximum gross weight of a helicopter located on said flat ring, said first disk containing scales representing ambient temperatures and critical altitudes arcuately disposed in registering relation to said apertures in said second disk, said second disk containing arcuately disposed scales adjacent the periphery thereof and radially disposed index marks adjacent said apertures representing meteorological factors and aircraft loading factors, whereby upon selective rotation of said second disk and said indicator relative to said first disk and said flat ring the weight and load capabilities of a helicopter for given operating conditions may be determined.

3. A mechanical computing device for computing weight and load capabilities of a helicopter comprising a base, a first disk recessed in and fixably secured to said base, a second disk rotatably mounted on said base above said first disk and including radially disposed apertures therein for viewing areas of said first disk, a flat ring in the same plane as said second disk secured to said base and encompassing said first and second disks, said flat ring having circumferentially spaced slots and fastening means passing through said slots adjustably securing said ring to said base and an indicator rotatably mounted on said base coaxially with said first and second disks and overlying said second disk and extending beyond said second disk to said flat ring, a uniformly divided scale located on a portion of said flat ring representing maximum gross weight of a helicopter, said first disk containing scales representing ambient temperatures and critical altitudes arcuately disposed in registering relation to said apertures in said second disk, said second disk containing arcuately disposed scales adjacent the periphery thereof and radially disposed index marks adjacent said apertures representing meteorological factors and aircraft loading factors, whereby upon selective rotation of said second disk and said indicator relative to said first disk and said flat ring the weight and load capabilities of a helicopter for given operating conditions may be determined.

4. A mechanical computing device for computing weight and load capabilities of a helicopter comprising a base, a first disk recessed in and fixedly secured to said base, a second disk rotatably mounted on said base above said first disk and including radially disposed apertures therein for viewing areas of said first disk, a flat ring secured to said base and encompassing said first and second disks, said flat ring being in the same plane as said second disk and having circumferentially spaced slots and fastening means passing through said slots adjustably securing said ring to said base, and an indicator rotatably mounted on said base coaxially with said first and second disks and overlying said second disk and extending beyond said second disk to said flat ring, a uniformly divided scale representing maximum gross weight of a helicopter located on a portion of said flat ring, said first disk containing scales representing ambient temperatures and critical altitudes arcuately disposed in registering relation to said apertures in said second disk, said second disk containing arcuately disposed scales adjacent the periphery thereof and radially disposed index marks adjacent said apertures representing meteorological factors and aircraft loading factors, whereby upon selective rotation of said second disk and said indicator relative to said first disk and said flat ring the weight and load capabilities of a helicopter for given operating conditions may be determined.

5. A mechanical computing device for computing weight and load capabilities of a helicopter comprising a base, a first disk recessed in and fixedly secured to said base, a second disk rotatably mounted on said base above said first disk and including radially disposed apertures therein for viewing areas of said first disk, a flat ring secured to said base and encompassing said first and second disks and being in the same plane as said second disk, said flat ring having circumferentially spaced slots and fastening means passing through said slots adjustably securing said ring to said base and an indicator rotatably mounted on said base coaxially with said first and second disks and overlying said second disk and extending beyond said second disk to said flat ring, a uniformly divided scale representing maximum gross weight of a helicopter located on a portion of said flat ring, said first disk containing scales representing ambient temperatures and critical altitudes arcuately disposed in registering relation to said apertures in said second disk, said second disk containing arcuately disposed scales adjacent the periphery thereof representing fuel and net load, pressure altitude, ambient-dew point temperature differential and surface wind, said second disk containing ground effect index marks adjacent said apertures, whereby upon selective rotation of said second disk and said indicator relative to said first disk and said flat ring the weight and load capabilities of a helicopter for given operating conditions may be determined.

6. A computer for determining the maximum gross weight and net payload for a particular helicopter under known atmospheric and flight conditions comprising a fixed member having on a portion thereof a maximum gross weight scale graduated in weight units and extending over the entire gross weight range of the particular helicopter, a second fixed member having thereon an ambient temperature scale and a critical altitude scale for use when the helicopter operation is to be within ground effects and an ambient temperature scale and a critical altitude scale for use when the operation of the helicopter is to be out of ground effects, said ambient temperature and critical altitude scales having a definite positional relationship to said maximum gross weight scale, means for adjusting the positional relationship between said ambient temperature and critical altitude scales and said maximum gross weight scale to vary said definite relationship, a first movable member having thereon four spaced apart indicator lines respectively registerable at selected settings with said ambient temperature scales and said critical altitude scales, and air pressure scales for the air pressure above and below critical altitude alternatively registerable with said maximum gross weight scale when one of said indicator lines is set relative to the corresponding ambient temperature or critical altitude scale, a second movable member carrying an indicator line effective to indicate a value on said maximum gross weight scale when positioned at a selected setting on one of said air pressure scales after one of said four indicator lines has been selectively set on one of said ambient temperature or critical altitude scales, said first movable member also carrying an ambient temperature dew point scale and a wind velocity scale graduated in precomputed units and consecutively movable into selected settings with the indicator line on said second movable member to correct the initially determined maximum gross weight for the dew point factor and the relative wind velocity, and a fuel load scale and operating load scale consecutively registerable with the indicator line on said second movable member to subtractively determine the maximum net load value from the corrected gross weight value.

References Cited in the file of this patent

UNITED STATES PATENTS

| | | |
|---|---|---|
| 766,009 | Winslow | July 26, 1904 |
| 946,043 | Hill | Jan. 11, 1910 |
| 2,328,881 | Saunders | Sept. 7, 1943 |
| 2,706,081 | Dowling et al. | Apr. 12, 1955 |
| 2,867,381 | Clapp | Jan. 6, 1959 |

FOREIGN PATENTS

| | | |
|---|---|---|
| 688,482 | Germany | Feb. 22, 1940 |